US010015100B1

(12) United States Patent
Bishara et al.

(10) Patent No.: US 10,015,100 B1
(45) Date of Patent: *Jul. 3, 2018

(54) NETWORK DEVICE ARCHITECTURE USING CACHE FOR MULTICAST PACKETS

(71) Applicant: Marvell Israel (M.I.S.L) Ltd., Yokneam (IL)

(72) Inventors: Amir Bishara, Tel-Aviv Jaffa (IL); Shira Turgeman, Nirit (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,791

(22) Filed: Feb. 9, 2017

Related U.S. Application Data

(63) Continuation of application No. 14/506,257, filed on Oct. 3, 2014, now Pat. No. 9,571,541.

(Continued)

(51) Int. Cl.
*H04L 12/801* (2013.01)
*H04L 12/931* (2013.01)
(Continued)

(52) U.S. Cl.
CPC ............ *H04L 47/15* (2013.01); *H04L 12/18* (2013.01); *H04L 45/16* (2013.01); *H04L 47/806* (2013.01);
(Continued)

(58) Field of Classification Search
CPC ... H04L 12/18; H04L 29/06455; H04L 45/16; H04L 47/15; H04L 47/806;
(Continued)

(56) References Cited

U.S. PATENT DOCUMENTS 6,032,190 A 2/2000 Bremer et al.
6,807,179 B1 10/2004 Kanuri et al.
(Continued)

FOREIGN PATENT DOCUMENTS

CN 1677952 A 10/2005
WO WO-99/07180 A2 2/1999

OTHER PUBLICATIONS

Bhattachryya, "An overview of source specific multicast (SSM)," The Internet Society, RFC3569, pp. 1-14 (Jul. 2003).
(Continued)

*Primary Examiner* — Timothy J Weidner (57) ABSTRACT

A packet received via a network is stored in a packet memory. Information in a header of the packet is analyzed to determine multiple ports to which the packet is to be forwarded. The packet is read from the packet memory in connection with transmitting the packet via a first port among the multiple ports. Packet data corresponding to the packet is stored in a packet cache different than the packet memory. In connection with forwarding one or more instances of the packet to ports among the multiple ports, the packet data is read, based on information included in a packet descriptor associated with the packet, from the packet cache. Ones of the one or more instances of the packet are forwarded, using the data corresponding to the packet read from the packet cache and without further accessing the packet memory, to respective one or more of the multiple ports.

21 Claims, 4 Drawing Sheets

Related U.S. Application Data (60) Provisional application No. 61/919,538, filed on Dec. 20, 2013, provisional application No. 61/886,393, filed on Oct. 3, 2013.

(51) Int. Cl.
  *H04L 12/927* (2013.01)
  *H04L 12/879* (2013.01)
  *H04L 12/861* (2013.01)
  *H04L 12/761* (2013.01)
  *H04L 12/18* (2006.01)
  *H04L 29/06* (2006.01)

(52) U.S. Cl.
  CPC .......... *H04L 49/201* (2013.01); *H04L 49/901* (2013.01); *H04L 49/9063* (2013.01); *H04L 65/4076* (2013.01); *H04L 69/22* (2013.01)

(58) Field of Classification Search
  CPC ............................. H04L 49/201–49/203; H04L 49/901–49/9026; H04L 49/9063–49/9078; H04L 49/9094; H04L 61/2069; H04L 65/4076; H04L 69/22
  See application file for complete search history.

(56) References Cited

U.S. PATENT DOCUMENTS

| | | |
|---|---|---|
| 7,636,319 B2 | 12/2009 | Shankar et al. |
| 7,729,351 B2 | 6/2010 | Tatar et al. |
| 7,924,860 B1 | 4/2011 | Frailong et al. |
| 7,991,926 B1 | 8/2011 | Arad |
| 8,358,651 B1 | 1/2013 | Kadosh et al. |
| 9,112,708 B1 | 8/2015 | Arad et al. |
| 9,571,541 B1 * | 2/2017 | Bishara ................ H04L 49/201 370/390 |
| 2007/0168531 A1 | 7/2007 | Sitaraman et al. |
| 2007/0171927 A1 | 7/2007 | Paik et al. |
| 2008/0037531 A1 | 2/2008 | Donoghue et al. |
| 2008/0315985 A1 | 12/2008 | Johnsen et al. |
| 2010/0142398 A1 | 6/2010 | Arad et al. |
| 2011/0007741 A1 | 1/2011 | Kreeger et al. |
| 2011/0149729 A1 | 6/2011 | Benner et al. |
| 2011/0164616 A1 | 7/2011 | Kloth et al. |
| 2012/0002546 A1 | 1/2012 | Sundararaman et al. |
| 2012/0177047 A1 | 7/2012 | Roitshtein |
| 2013/0083796 A1 * | 4/2013 | Matthews ............... H04L 49/201 370/390 |
| 2013/0223281 A1 | 8/2013 | Pandit |
| 2014/0098816 A1 * | 4/2014 | Matthews ............. H04L 49/201 370/390 |
| 2014/0169378 A1 | 6/2014 | Shumsky et al. |
| 2014/0192815 A1 | 7/2014 | Shumsky et al. |

OTHER PUBLICATIONS

Cain et al., "Internet Group Management Protocol, Version 3" The Internet Society, RFC3376, pp. 1-53 (Oct. 2002).

Speakman et al., "PGM Reliable Transport Protocol Specifications," The Internet Society, RFC3208, pp. 1-111 (Dec. 2001).

* cited by examiner

NETWORK DEVICE ARCHITECTURE USING CACHE FOR MULTICAST PACKETS

CROSS-REFERENCES TO RELATED APPLICATIONS

This disclosure is a continuation of U.S. patent application Ser. No. 14/506,257, entitled "Network Device Architecture Using Cache for Multicast Packets," filed on Oct. 3, 2014, which claims the benefit of U.S. Provisional Patent Application No. 61/886,393, entitled "Read Client Cache for Multicast Packets," filed on Oct. 3, 2013, and U.S. Provisional Patent Application No. 61/919,538, also entitled "Read Client Cache for Multicast Packets," filed on Dec. 20, 2013. The entire disclosures of the applications referenced above are hereby incorporated by reference herein in their entireties and for all purposes.

FIELD OF TECHNOLOGY

The present disclosure relates generally to network devices such as network switches, bridges, routers, etc., and more particularly, to architectures in network devices for handling multicast packets.

BACKGROUND

Network switches, such as bridges and routers, forward packets through a network based on addresses in the packets. A network switch typically includes a plurality of ports coupled to different network links. The network switch may receive a packet via one port and process address information in a header of the packet to decide via which other port or ports the network switch should transmit the packet. The network switch then forwards the packet to the determined one or more other ports. In various network switches, packets are stored in a packet memory during processing, and are read from the packet memory after processing and before forwarding to the other port or ports, irrespective of whether the packet is to be forwarded to a single port or to multiple ports. Because network switches often handle packets being communicated via very high rate communication links, packets typically must be written to and read from the packet memory at high rates and the packet memory typically must be capable of handling a high throughput of packets.

SUMMARY

In an embodiment, a network device comprises one or more receive client devices configured to store, in a packet memory, packets that are received from one or more network links, and a packet cache, different than the packet memory, configured to selectively cache packet data. The network device also comprises a packet processor configured at least to determine one or more ports to which a particular stored packet is to be transmitted, and one or more transmit client devices configured to read, from the packet memory, a first packet to be forwarded to multiple ports determined by the packet processor, and read, from the packet cache based on information included in a packet descriptor associated with the first packet, data corresponding to the first packet in connection with forwarding one or more instances of the first packet. The one or more transmit client devices are also configured to forward ones of the one or more instances of the first packet, using the data corresponding to the first packet read from the packet cache and without further accessing the packet memory, to respective one or more ports among the multiple ports determined by the packet processor.

In another embodiment, a method includes storing, in a packet memory, a first packet received via a network; analyzing information in a header of the first packet to determine multiple ports to which the first packet is to be forwarded; reading the first packet from the packet memory in connection with transmitting the first packet via a first port among the determined multiple ports; storing, in a packet cache different than the packet memory, packet data corresponding to the first packet; in connection with forwarding one or more instances of the first packet to ports among the determined multiple ports, reading, based on information included in a packet descriptor associated with the first packet, the packet data from the packet cache; and forwarding ones of the one or more instances of the first packet, using the data corresponding to the first packet read from the packet cache and without further accessing the packet memory, to respective one or more ports among the multiple ports.

DETAILED DESCRIPTION

In various embodiments described herein, a caching technique is utilized to improve the throughput of a network device. For example, in an embodiment in which a network device (e.g., a network switch, bridge, router, etc.) handles multicast (MC) packets, the network device utilizes caches for forwarding MC packets to reduce the number of times that the MC packet needs to be read from a packet memory. According to an embodiment, a single MC packet is received at the network device and stored in a packet memory, but the network device determines that multiple instances of the MC packet are to be forwarded to several ports. In prior art devices, such an MC packet was read from the packet memory each time an instance of the MC packet was to be multicast to a different port. In an embodiment described below, however, the network device reads the MC packet from the packet memory only once. After processing to determine a port or ports to which the packet is to be forwarded, if the packet is a MC packet it is forwarded to a first port and written to a cache. For each subsequent forwarding operation of the MC packet, it is read from the cache without accessing the packet memory.

Figure 1:
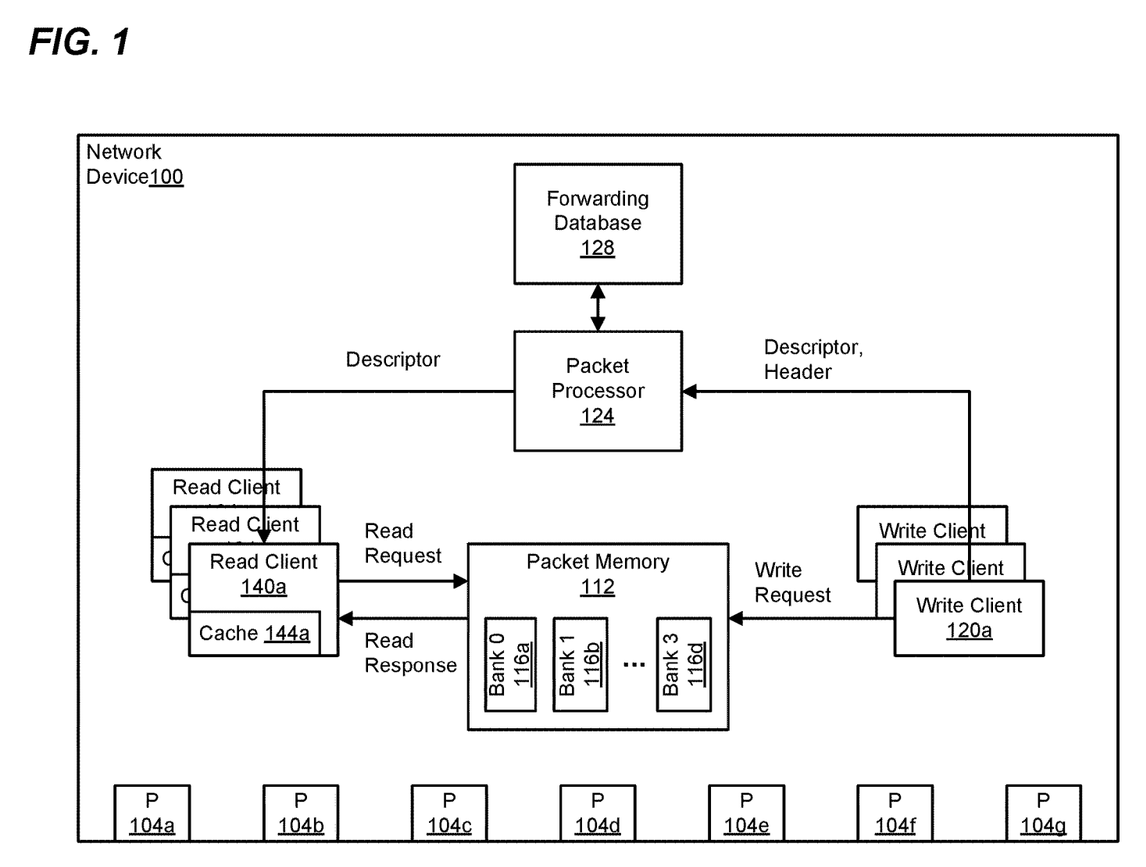
FIG. 1 is a block diagram of an example network device with a memory cache system for use with multicast (MC) packets, according to an embodiment.

FIG. 1 is a block diagram of an example network device 100, according to an embodiment. The network device 100 includes a plurality of ports 104 communicatively coupled to a plurality of network links (not shown). Although seven ports 104 are illustrated in FIG. 1, the network device 100 includes any suitable number of ports 104 in various embodiments.

A plurality of receive/write client devices 120 are coupled to the ports 104. Each receive/write client device 120 is configured to store a packet that was received via one of the ports 104 in a packet memory 112. In an embodiment, the packet memory 112 is organized as a plurality of memory banks 116 that can be accessed simultaneously for purposes of improving memory throughput. Although four banks 116 are illustrated in FIG. 1, the network device 100 includes any suitable number of banks 116 in various embodiments. In an embodiment, the packet memory 112 comprises a single bank 116.

The plurality of receive/write client devices 120 are coupled to the ports 104 and to the packet memory 112. Each receive/write client device 120 is configured to write a packet, received via a port 104, to the packet memory 112. For example, in an embodiment, each receive/write client 120 is configured to issue a write request to the packet memory 112 to cause a packet to be stored in the packet memory 112. In some embodiments in which the packet memory 112 includes multiple banks 116, relatively short packets are stored in a single bank 116 whereas relatively long packets are stored across multiple ones of the banks 116. As merely an illustrative example, a packet less than or equal to 128 bytes is stored in a single bank 116; a packet greater 128 bytes and less than or equal to 256 bytes is stored across two banks 116; a packet greater 256 bytes and less than or equal to 384 bytes is stored across three banks 116; etc. In other embodiments, packets are written to the different banks 116 according to any other suitable convention.

Additionally, a packet descriptor associated with a packet to be processed is generated for each packet, in an embodiment. For example, each receive/write client device 120 is configured to generate a packet descriptor associated with a packet to be processed, in an embodiment. In other embodiments, another suitable device or module within the network device 100 is configured to generate a packet descriptor associated with a packet to be processed. The packet descriptor contains information that a packet processor 124 utilizes to process the associated packet. In some embodiments, the packet descriptor includes an address, a pointer, or other suitable indicator of a location in the packet memory 112 at which the associated packet is stored. In some embodiments, the receive/write client device 120 determines the location in the packet memory 112 at which the associated packet is to be stored. In some embodiments, the indicator of the location in the packet memory 112 at which the associated packet is stored is received from the packet memory 112 in response to a write request.

In some embodiments, ones of the receive/write client devices 120 comprise a direct memory access (DMA) device configured to write to the packet memory 112 packets that were received via one or more ports 104, and are sometimes referred to as "receive DMA devices 120". Although three receive/write client devices 120 are illustrated in FIG. 1, the network device 100 may include any suitable number of receive/write client devices 120 in various embodiments.

As discussed above, packet descriptors are provided to the packet processor 124. In some embodiments, the receive/write client devices 120 are configured to provide packet headers or portions of packet headers to the packet processor 124.

The packet processor 124 is configured to process a packet descriptor (and in some cases header information not included in the descriptor) to determine one or more of the ports 104 to which the packet associated with the packet descriptor (or header information) is to be forwarded. In an embodiment, the packet processor 124 is coupled to a forwarding database 128 that stores forwarding information (e.g., port information) associated with addresses (e.g., media access control (MAC) addresses, Internet Protocol (IP) addresses, etc.) and/or other suitable information. In some embodiments the forwarding database 128 is configured as or coupled to a dedicated accelerator device that is external to one or more packet processing engines within the packet processor 124, as seen in FIG. 1. Alternatively, the forwarding database is configured as or coupled to an engine that is disposed within a packet processing pipeline of the packet processor 124. In an embodiment, the packet processor 124 is configured to utilize information in the packet descriptor (and/or in some cases header information not included in the descriptor) to look up information in the forwarding database 128 that indicates one or more ports 104 to which an associated packet is to be forwarded. In some embodiments, the processor 124 is configured to store in the packet descriptor an indication(s) of the one or more ports 104 to which the associated packet is to be forwarded.

The packet processor 124 is configured to determine whether a packet is a unicast (UC) packet to be forwarded to a single port or a multicast (MC) packet to be forwarded to more than a single port, and store a suitable indication of whether the packet is a UC packet or an MC packet in the associated descriptor, in an embodiment. This determination is made, in an embodiment, based on processing information (e.g., address information or other suitable information) in the packet descriptor (and/or in some cases header information not included in the descriptor).

In some embodiments, the packet processors is configured to perform other operations in addition to i) determining the port or ports to which a packet is to be forwarded, and ii) determining whether a packet is a UC packet or a MC packet. For example, in some embodiments, the packet processor 124 is configured to determine whether to and/or how to modify a header of an associated packet stored in the packet memory 112, in an embodiment. For example, in some scenarios, the packet processor 124 causes a header of the packet to be modified, e.g., to change a next hop address, to add an encapsulating header, to remove an encapsulating header, etc. For example, in an embodiment, the packet processor 124 may modify the associated descriptor to indicate to another device or module of the network device (e.g., a header alteration unit (not shown)) whether to or how to modify a header.

Packet descriptors processed by the packet processor 124 are provided to a plurality of read client devices 140. Each read client device 140 is configured to utilize a location indicator in a packet descriptor to read data corresponding to the associated packet from the packet memory 112. The read client device 140 then provides the packet data (read from the packet memory 112) to a port 104, indicated by the associated packet descriptor, for transmission via the port 104.

For a unicast packet, the packet is read once from the packet memory 112 and transmitted via the appropriate port 104 as determined from processing the descriptor, in an embodiment. In contrast, an MC packet needs to be forwarded multiple times, and in some scenarios tens or even hundreds of times, to multiple ports. In conventional systems, forwarding of MC packets requires the MC packet to be read from a packet memory a multitude of times corresponding to a number of instances that the MC packet is to be forwarded to a different location.

In embodiments described herein, in the network device 100, a transmit/read client device 140 includes a corresponding packet cache 144. When the transmit/read client device 140 initially reads data corresponding to an MC packet from the packet memory 112, the transmit/read client device 140 stores the packet data corresponding to the MC packet in the cache 144, and forwards a first instance of the MC packet to a first target port. For additional instances of the MC packet that are to be transmitted to additional locations, for example to another port 104, packet data corresponding to the MC packet is retrieved from the packet cache 144 by the transmit/read client device 140. Thus, processing of the additional instances of the MC packet is performed without the need to further access the packet memory 112, in an embodiment.

In some embodiments, each transmit/read client device 140 comprises a DMA device configured to read from the packet memory 112 packets that are to be transmitted via one or more ports 104, and are sometimes referred to as "transmit DMA devices 140". Although three transmit/read client devices 140 are illustrated in FIG. 1, the network device 100 may include any suitable number of transmit/read client devices 140 in various embodiments.

In some embodiments, the caches 144 are not included in the transmit/read client devices 140, but are located elsewhere in the network device 100, such as in or coupled to the packet memory 112. In these embodiments, when a transmit/read client device issues a read request to the packet memory for data corresponding to an MC packet, hardware in the network device 100 determines whether requested data is stored in the cache 144. If the requested data is stored in the cache 144, the requested data is provided to the transmit/read client device 140 from the cache 144 instead of the packet memory 112.

Figure 2A:
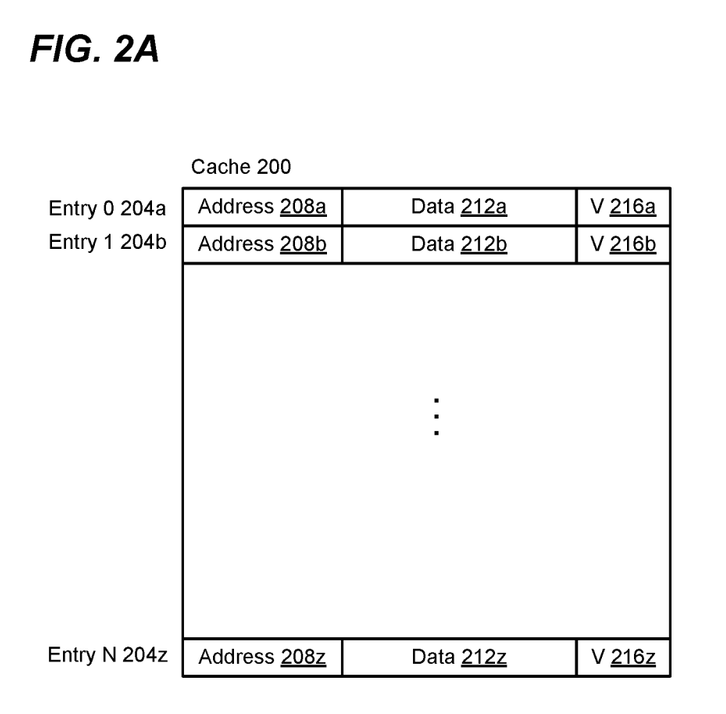
FIG. 2A is a block diagram of an example cache that may be utilized in a network device such as the network device of FIG. 1, according to an embodiment.

FIG. 2A is a block diagram of an example cache 200 that is utilized in a transmit/read client device such as the transmit/read client devices 140 of FIG. 1, according to an embodiment. Thus, in an embodiment, each transmit/read client device 140 of FIG. 1 includes a respective cache 200. In other embodiments, however, the transmit/read client devices 140 of FIG. 1 utilize a suitable cache different than the cache 200 of FIG. 2A. Similarly, the cache 200 can be utilized with suitable transmit/read client devices other than the transmit/read client devices 140 and/or other suitable network devices other than the network device 100 of FIG. 1. Also, the cache 200 can be utilized in systems in which the cache 200 is not included in a transmit/read client device. Merely for explanatory purposes, the cache 200 of FIG. 2A will be described with reference to FIG. 1.

The cache 200 includes a plurality of entries 204. Each entry 204 includes a portion 208 for storing an indication of a location (e.g., an address) in the packet memory 112 to which the entry 204 corresponds, in an embodiment. Additionally, each entry 204 includes a portion 212 for storing data read from the packet memory 112 at the location indicated by the portion 208, in an embodiment. Each entry 204 further includes a portion 216 to indicate whether the entry 204 is valid, in an embodiment. For example, an aging process is utilized to age out entries 204 to help prevent invalid data 212 from being unintentionally read from the cache 200, in some embodiments.

In an embodiment, when a transmit/read client 140 receives a packet descriptor corresponding to an MC packet, the transmit/read client 140 examines the entries 204 to determine if an address in the packet descriptor matches an address 208 in the cache 200. If the address in the packet descriptor does not match any of the addresses 208, the transmit/read client 140 issues a read request to the packet memory 112 to obtain the MC packet data from the packet memory 112. Next, the transmit/read client 140 stores the address from the packet descriptor to an appropriate entry 204; stores the MC packet data read from the packet memory 112 to the entry 204; and marks the entry valid. On the other hand, if the address in the packet descriptor matches an address 208 and the corresponding entry 204 is valid, the transmit/read client 140 reads the MC packet data from the appropriate entry 204 of the cache 200 instead of issuing a read request to the packet memory 212.

Figure 2B:
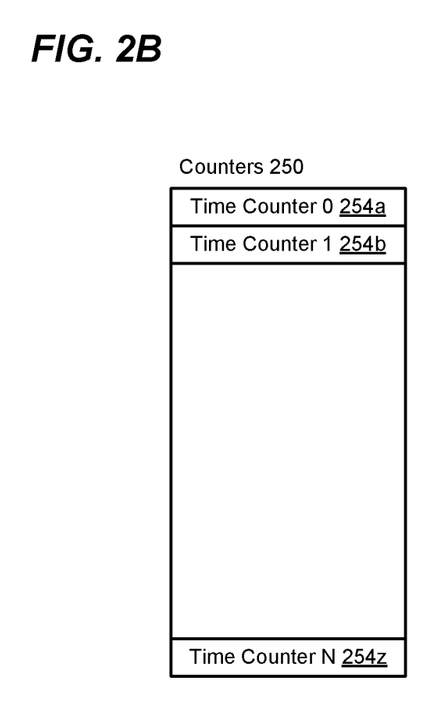
FIG. 2B is a block diagram of a plurality of counters that may be utilized with the cache of FIG. 2A to perform an aging process, according to an embodiment.

FIG. 2B is a block diagram of a plurality of counters 250 that are utilized with the cache 200 to perform an aging process, according to an embodiment. In other embodiments, however, the cache 200 utilizes another suitable aging mechanism. Similarly, the counters 250 can be utilized with another suitable cache other than the cache 200 of FIG. 2A. Merely for explanatory purposes, the counters 250 are discussed with reference to the cache 200 of FIG. 2A.

The cache 200 maintains a counter 254 for each entry 204 of the cache, and thus each counter 254 is associated with a corresponding one of the entries 204, in an embodiment. When an entry 204 is accessed by the transmit/read client device 140, the corresponding counter 254 is reset. When it is determined that a counter 254 has reached a threshold value (e.g., a predetermined value that is, in some embodiments, reconfigurable), this indicates that the corresponding entry 204 is no longer valid. Thus, when it is determined that a counter 254 has reached the threshold value, the corresponding entry 204 is marked invalid, e.g., the portion 216 is modified to indicate the corresponding entry 204 is invalid.

Figure 3:
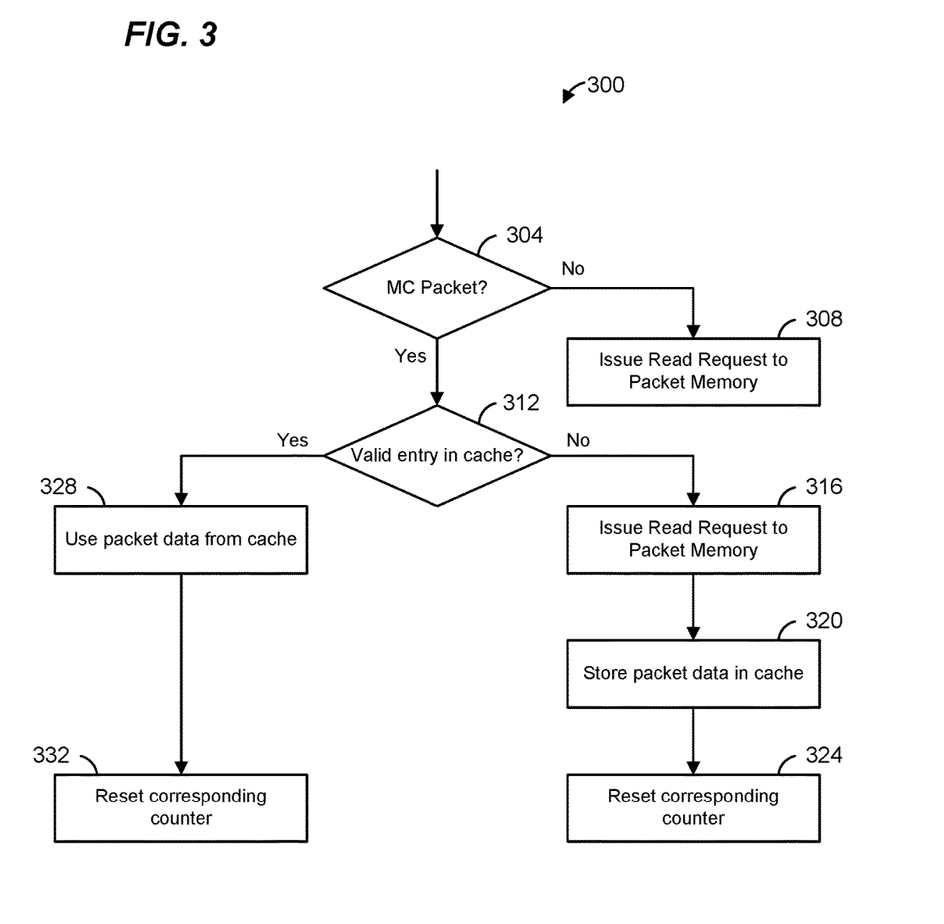
FIG. 3 is a flow diagram of an example method for utilizing a packet memory and a read cache for MC packets, according to an embodiment.

FIG. 3 is a flow diagram illustrating an example method 300 for utilizing a packet memory with a read cache for MC packets, according to an embodiment. In an embodiment, the network device 100 of FIG. 1 utilizes the cache 200 of FIG. 2A along with the counters 250 of FIG. 2B, and also implements the method 300 to process MC packets. Thus, the method 300 is described with reference to FIGS. 1, 2A, and 2B merely for explanatory purposes. In other embodiments, the method 300 is implemented by another suitable network device and/or cache. In some embodiments, the method 300 is implemented at least partially by the transmit/read client device 140.

In an embodiment, the method 300 is implemented, commencing at block 304, when it is determined that a packet is an MC packet to be forwarded from the network device 100. For example, the transmit/read client device 140 determines whether the packet is an MC packet by examining the packet descriptor associated with the packet, in an embodiment.

If it is determined at block 304 that the packet is not an MC packet, the flow proceeds to block 308. At block 308, a read request is issued to the packet memory. For example, the transmit/read client device 140 issues a read request to the packet memory 212. Packet data read from the packet memory 212 is then forwarded to a port for egress from the network device 100.

On the other hand, if it is determined at block 304 that the packet is an MC packet, the flow proceeds to block 312. At block 312, it is determined whether the cache 200 includes valid packet data associated with a descriptor corresponding to the MC packet. For example, in an embodiment, the transmit/read client device 140 compares a packet memory location indicator (e.g., an address, a pointer, etc.) in the packet descriptor to location information fields (e.g., address information fields) stored in cache entries 204. When the packet memory location indicator in the packet descriptor matches location information 208 (e.g., address information) stored in one of the cache entries 204, the corresponding packet data is in the cache 200, in an embodiment. Additionally, in some embodiments, the transmit/read client device 140 further determines whether the entry having the matching location indicator 208 is valid, for example, by examining the portion 216 of a matching entry.

If it is determined at block 312 that there is no valid entry in the cache 200 corresponding to the location indicator in the packet descriptor, the flow proceeds to block 316. At block 316, a read request is issued to the packet memory. For example, the transmit/read client device 140 issues a read request to the packet memory 212. Packet data read from the packet memory 212 is then forwarded to a port for egress from the network device.

Additionally, at block 320, packet data read from the packet memory at block 316 is stored in an entry 204 of the cache 200. In some embodiments, block 320 comprises storing corresponding location information (e.g., address information) 208 in the entry 204; storing packet data to the portion 212 of entry 204; and marking the entry 204 at portion 216 as being valid.

At block 324, a counter 254 corresponding to the entry 204 at which the packet data was stored (block 320) is initialized. In an embodiment, initializing the counter 254 indicates to an aging process or device that the entry 204 was recently accessed. An example method for aging and invalidating entries in a read cache, according to an embodiment, is described below, and this example method uses counters, such as the counter 254, to measure an amount of time since an entry in the cache was accessed.

If, however, it was determined at block 312 that a valid entry 204 is in the cache, the flow proceeds to block 328. At block 328, packet data 212 is read from the appropriate entry 204 in the cache and is then provided to a port for transmission. For example, the transmit/read client device 140 reads the packet data 212 from the cache 200 and provides the packet data 212 to one of the ports 204.

At block 332, a counter 254 corresponding to the entry 204 at which the packet data was retrieved (block 328) is initialized. In an embodiment, initializing the counter 254 indicates to an aging process or device that the entry 204 was recently accessed.

In embodiments in which the cache 200 is not included in the transmit/read client device 140, the method 300 may be suitably modified. For example, the method 300 may be modified such that a read request is issued to the packet memory 112 whether or not the packet is an MC packet, and packet data provided in response to the read request is provided from a cache 200 (e.g., coupled to a read interface of the packet memory 112) if there is valid data in the cache 200 instead of retrieving the packet data from the packet memory 112 itself. Thus, in scenarios in which there is valid MC packet data in the cache 200, for example, the MC packet data is retrieved by the read interface of the packet memory 112 from the cache 200 rather than from the packet memory 112 itself.

Figure 4:
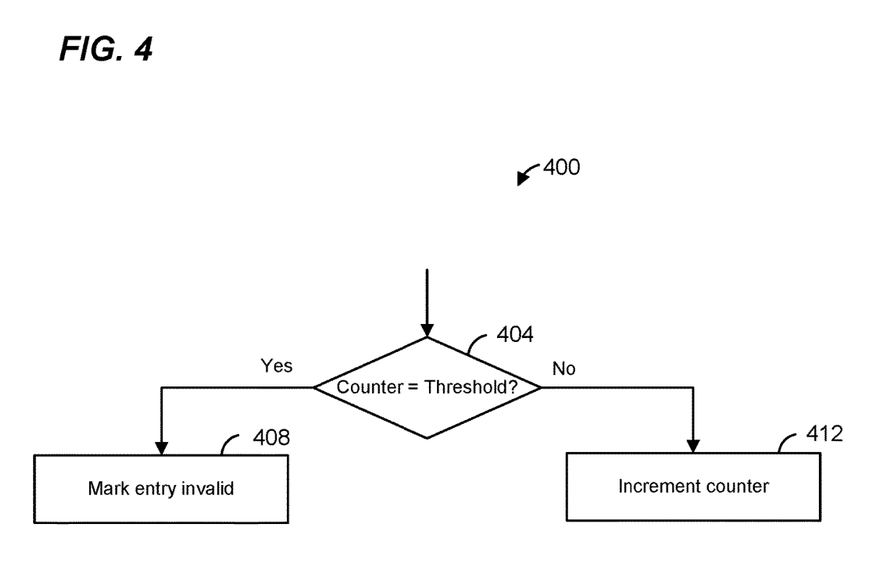
FIG. 4 is a flow diagram of an example method for aging and invalidating entries in a read cache for MC packets, according to an embodiment.

FIG. 4 is a flow diagram illustrating an example method 400 for aging and invalidating entries in a read cache for MC packets, according to an embodiment. In an embodiment, the network device 100 of FIG. 1 utilizes the cache 200 of FIG. 2A along with the counters 250 of FIG. 2B, and also implements the method 400 to determine whether an entry in cache 200 has aged out. Thus, the method 400 is described with reference to FIGS. 1, 2A, and 2B merely for explanatory purposes. In other embodiments, the method 400 is implemented by another suitable network device and/or cache. In some embodiments, the method 400 is implemented at least partially by the transmit/read client device 140.

In some embodiments, the method 400 is implemented periodically. For example, in an embodiment, the method 400 is implemented at a rate corresponding to a rate at which counters are to be incremented. Additionally, in some embodiments, the method 400 is implemented for each counter 254 that corresponds to a valid entry 204 of the cache 200.

At block 404, a value of the counter 254 is compared to a threshold, which may be configurable, for example, and it is determined whether the value of the counter 254 meets the threshold (e.g., equals the threshold, is greater than or equal to the threshold, etc.). In an embodiment, the counter 254 is incremented at a desired rate and provides a measure of an amount of time since an entry, associated with the counter 254, in the cache was accessed. Thus, in an embodiment, when the counter 254 meets the threshold, this indicates that a particular amount of time has elapsed since the corresponding cache entry was accessed. If it is determined that the counter meets the threshold, the flow proceeds to block 408.

At block 408, the entry 204 corresponding to the counter 254 is marked invalid. As described, in an embodiment, when the counter 254 meets the threshold, this indicates that the particular amount of time has elapsed since the corresponding cache entry was accessed, and thus the corresponding entry 204 should be considered invalid due to age. For example, in an embodiment, the transmit/read client device 140 writes appropriate information to the portion 216 of the entry 204 to indicate the entry 204 is invalid.

On the other hand, if it is determined at block 404 that the counter does not meet the threshold, the flow proceeds to block 412. At block 412, the counter 254 is incremented. In an embodiment, the method 400 is implemented at a desired rate and thus the counter is incremented at the desired rate and accordingly provides a measure of time.

In other embodiments, the counter 254 is initialized to a nonzero value and, at block 412, the counter is decremented. In some embodiments in which the counter 254 is decremented, at block 404, determining whether the value of the counter 254 meets the threshold comprises determining whether the value of the counter is zero.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A network device, comprising:
one or more receive client devices configured to store, in a packet memory, packets that are received from one or more network links;
a packet cache, different than the packet memory, configured to selectively cache packet data;
a packet processor configured at least to determine one or more ports to which a particular stored packet is to be transmitted; and
one or more transmit client devices configured to
read, from the packet memory, a first packet to be forwarded to multiple ports determined by the packet processor,
read, from the packet cache based on memory location information included in a packet descriptor associated with the first packet, data corresponding to the first packet in connection with forwarding one or more instances of the first packet, and
forward ones of the one or more instances of the first packet, using the data corresponding to the first packet read from the packet cache and without further accessing the packet memory, to respective one or more ports among the multiple ports determined by the packet processor.

2. The network device of claim 1, wherein the one or more transmit client devices are further configured to
read, from the packet memory, a second packet to be forwarded to only a single port determined by the packet processor, and
forward the second packet to the single port without accessing the packet cache.

3. The network device of claim 1, wherein a first transmit client device among the one or more transmit client devices comprises the packet cache.

4. The network device of claim 1, wherein the one or more transmit client devices are configured to:
receive, from the packet processor, the packet descriptor associated with the first packet;
ascertain that the first packet is of multicast-type based on first information included in the packet descriptor; and
in response to ascertaining that the first packet is of multicast-type, use second information in the packet descriptor to determine whether corresponding packet data is stored in the packet cache.

5. The network device of claim 1, wherein the one or more transmit client devices are configured to:
store data corresponding to multiple packets in the packet cache as a plurality of entries; and
for each entry, store a respective indicator of a respective location of associated packet data in the packet memory.

6. The network device of claim 5, wherein the one or more transmit client devices are configured to:
for each entry, store in the entry a respective indicator of whether the entry is valid.

7. The network device of claim 1, wherein the one or more transmit client devices are configured to:
store data corresponding to multiple packets in the packet cache as a plurality of entries; and
for each of multiple entries, maintain a respective counter for aging.

8. The network device of claim 7, wherein the one or more transmit client devices are configured to:
for each of the multiple entries, initialize the respective counter each time the entry is accessed.

9. The network device of claim 7, wherein the one or more transmit client devices are configured to:
for each of the multiple entries, mark the entry invalid when the respective counter meets a threshold.

10. The network device of claim 1, further comprising the packet memory, the packet memory including a plurality of memory banks configured to be accessed simultaneously.

11. The network device of claim 10, further comprising a plurality of additional packet caches, wherein the one or more transmit client devices are configured to store in packet caches among the packet cache and the plurality of additional packet caches packet data corresponding to the first packet stored in the packet memory, and
when multiple instances of the first packet are to be forwarded to one or more of the ports, read from packet caches the packet data corresponding to the first packet.

12. A method, comprising:
storing, in a packet memory, a first packet received via a network;
analyzing information in a header of the first packet to determine multiple ports to which the first packet is to be forwarded;
reading the first packet from the packet memory in connection with transmitting the first packet via a first port among the determined multiple ports;
storing, in a packet cache different than the packet memory, packet data corresponding to the first packet;
in connection with forwarding one or more instances of the first packet to ports among the determined multiple ports, reading, based on memory location information included in a packet descriptor associated with the first packet, the packet data from the packet cache; and
forwarding ones of the one or more instances of the first packet, using the data corresponding to the first packet read from the packet cache and without further accessing the packet memory, to respective one or more ports among the multiple ports.

13. The method of claim 12, further comprising:
reading, from the packet memory, a second packet to be forwarded to only a single port determined by analyzing information in a header of the second packet, and
forwarding the second packet to the single port without accessing the packet cache.

14. The method of claim 12, wherein:
reading the first packet from the packet memory in connection with forwarding the first packet to the first port comprises issuing a read command from a transmit client device to the packet memory, and
reading the packet data corresponding to the first packet from the packet cache in connection with forwarding one or more instances of the first packet to one or more ports among the determined multiple ports comprises reading the packet data from the packet cache without issuing any further read commands from the transmit client device to the packet memory.

15. The method of claim 12, further comprising:
inserting, in the descriptor associated with first packet, an indicator of a location in the packet memory at which packet data corresponding to the first packet is stored in the packet memory; and using the indicator of the location in the packet descriptor to determine whether corresponding packet data is stored in the packet cache.

16. The method of claim 12, further comprising:

storing, in the packet cache, as a plurality of entries packet data corresponding to multiple packets; and for each entry, storing in the entry a respective indicator of a respective location of associated packet data in the packet memory.

17. The method of claim 16, further comprising:

for each entry, storing in the entry a respective indicator of whether the entry is valid.

18. The method of claim 12, further comprising:

storing, in the packet cache, as a plurality of entries packet data corresponding to multiple packets; and for each of multiple entries, maintaining a respective counter for aging.

19. The method of claim 18, further comprising:

for each of the multiple entries, initializing the respective counter each time the entry is accessed.

20. The method of claim 18, further comprising:

for each of the multiple entries, marking the entry invalid when the respective counter meets a threshold.

21. The method of claim 12, further comprising:

storing, in respective packet caches, packet data corresponding to the first packet stored in the packet memory; and when multiple instances of the first packet are to be forwarded to one or more of the ports, reading from the packet caches the packet data corresponding to the first packet.

\* \* \* \* \*